Nov. 23, 1965        J. KAPLAN         3,218,877
               SLIP CLUTCH MECHANISM
Filed March 1, 1962                2 Sheets-Sheet 1

Nov. 23, 1965  J. KAPLAN  3,218,877
SLIP CLUTCH MECHANISM
Filed March 1, 1962  2 Sheets-Sheet 2

United States Patent Office 3,218,877
Patented Nov. 23, 1965

3,218,877
SLIP-CLUTCH MECHANISM
Joseph Kaplan, Jericho, N.Y., assignor to Fairchild Camera and Instrument Corporation, a corporation of Delaware
Filed Mar. 1, 1962, Ser. No. 176,656
2 Claims. (Cl. 74—368)

This invention relates to slip-clutch mechanisms and, while it is of general application, it is particularly suitable for embodiment in a cartridge-type film magazine for high-speed cameras and will be described in such an environment.

It is well known that in transporting film past the film gate of a high-speed camera, the film must be moved intermittently, that is, it must be at rest during an actual exposure of a given frame and then advanced rapidly to bring the next frame into position in the film gate. At the same time, the film-feed spool and takeup spool, when fully loaded, have considerable inertia so that it becomes difficult to stop and start them in accordance with the required intermittent motion of the film. Therefore, it has been customary to provide compliance or slack loops between the two film spools and the film gate. However, such loops occupy an appreciable amount of space and are undesirable in compact cartridge-type film magazines. Another disadvantage inherent in compliance or slack loops is the unpredictability in the stopping of the film spools prior to exposure. A change of speed in elements of major inertia, such as the loaded film spools, during exposure imposes reactive motion on the camera and, in consequence, effects blurring of the picture.

It has also been proposed to drive the takeup spool through a constant-torque slip clutch and, by the use of brute force methods, compel the takeup spool to comply with the intermittent film motion. However, in systems of this type, the resulting tension on the film is a maximum when the takeup spool is substantially empty and progressively decreases as the spool fills up. Therefore, if a system is designed for adequate film tension when the takeup spool is full, then, when it is substantially empty, the film tension becomes so high as to be likely to cause film breakage. A condition similar to the slip clutch-takeup spool relationship exists in the feed spool-brake relationship. If a brake of sufficient torque is used to decelerate a full feed spool in accordance with the intermittent motion, then the film tension for an empty feed spool is so high as to be likely to cause film breakage. Furthermore, a system of this type requires an undesirably large power source for accelerating the takeup spool for all conditions of loading.

The present invention is directed to a new and improved slip-clutch mechanism for use in a high-speed intermittent film transport including a novel arrangement for braking the film-feed spool and for driving the film-takeup spool and automatically controlled in such a way that both spools comply with the required intermittent motion of the film.

It is an object of the invention therefore, to provide a new and improved slip-clutch mechanism for use in a high-speed intermittent film transport which obviates one or more of the disadvantages of prior film transports of the type described.

It is another object of the invention to provide a new and improved slip-clutch mechanism for use in a high-speed intermittent film transport having one or more of the following advantageous characteristics: absence of compliance loops in the film path; positive stopping of the film spools prior to exposure; maximum film tension well within the limits of the film in use; and moderate driving power requirements.

In accordance with the invention, there is provided in a film-transport apparatus, a slip-clutch mechanism comprising two independent constant-torque slip clutches, each having a driving element and a driven element and at least one of the clutches being of the overrunning type, the driven element of one of the slip clutches constituting a sole power input and the driving element of the other of the slip clutches constituting a sole power output, a bidirectional driving connection between the driving elements of the slip clutches, and a driving connection between the driven elements of the slip clutches, the drive ratios of such driving connections being unequal, whereby for speeds of the power output above a predetermined value only one of the slip clutches is effective and for speeds of the power output below such predetermined value both of the slip clutches are effective.

For a better understanding of the present invention, together with other and further objects thereof, reference is had to the following description taken in connection with the accompanying drawings, while its scope will be pointed out in the appended claims.

Referring to the drawings:

FIG. 3 is a cross-sectional detail view of the braking mechanism for the film-feed spool of FIGS. 1 and 2, while

Figure 1:
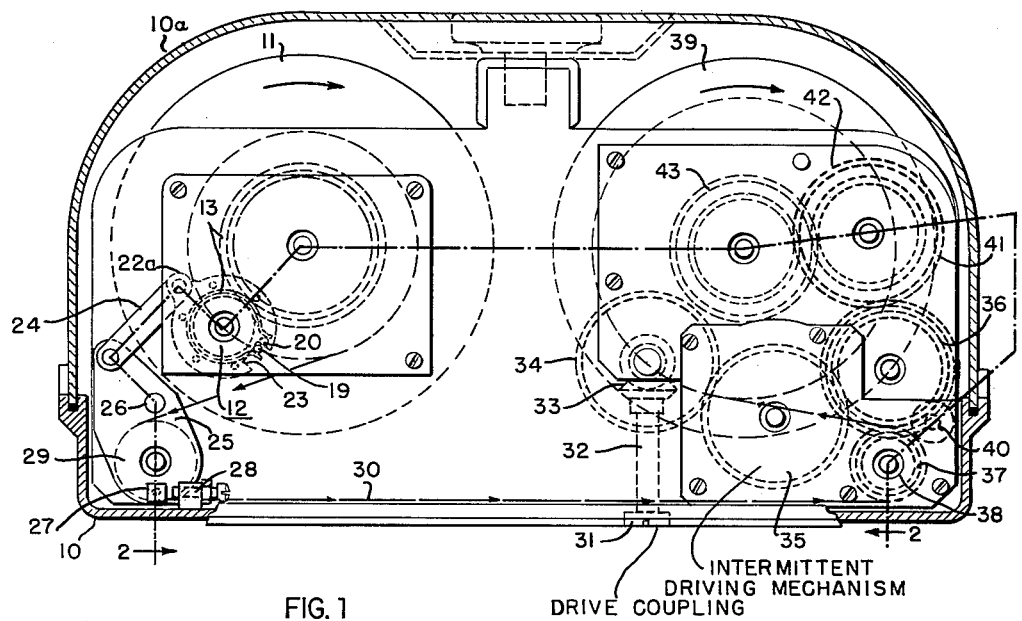
FIG. 1 is an end view of a film-transport system embodying the invention.
Figure 3:
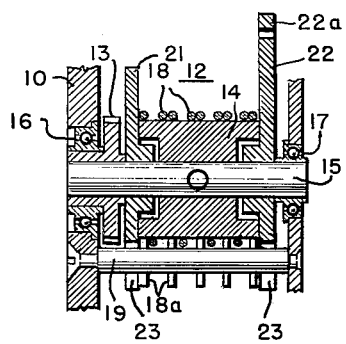
Figure 2:
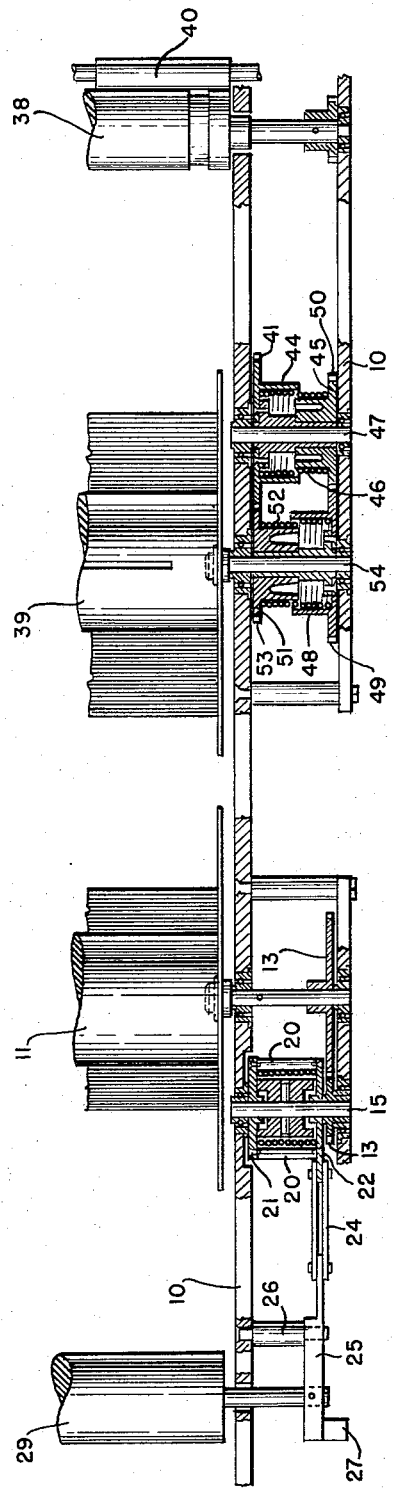
FIG. 2 is a longitudinal sectional view of the film transport of FIG. 1 along the line 2—2 of FIG. 1.

Referring now particularly to FIGS. 1 and 2 of the drawings, there is represented a high-speed intermittent film transport embodying the invention and comprising a casing or frame 10 having a removable cover 10a in which is disposed a film-feed spool 11 and an associated controllable brake mechanism 12 coupled to the feed spool and including a film-tension-responsive mechanism coupled to the brake for controlling its braking force. Specifically, the brake mechanism 12 is of the friction type and is coupled to the feed spool 11 by means of gearing 13. The brake mechanism 12 has a movable element or cage effective to vary its braking force. As shown more particularly in FIG. 3, the braking mechanism 12 includes a drum 14 pinned to a shaft 15 journalled in the casing 10 by suitable anti-friction bearings 16 and 17. Also secured to the shaft 15 is a gearing element 13 engaging a complementary gearing element 13 on the feed spool 11. Surrounding the drum 14 are a plurality of helical springs 18, each comprising preferably only one or two turns and having portions 18a radially extending from opposite ends thereof. Between the radially extending portions 18a of the friction springs are disposed a post 19 secured to the side walls of the casing 10 and one of a series of pins 20 extending between a pair of side walls 21 and 22 forming therewith a cage loosely journalled on the shaft 15. The side walls 21, 22 are provided with registering notches 23 engaging the stationary post 19 in order to limit the rotational movement of the cage. One of the side walls, for example the side wall 22, has an extension 22a to which is pivotally connected a link 24.

The tension-responsive mechanism further includes a crank 25 mounted on a pivot 26 secured in the casing 10, one end of the crank 25 being pivotally connected to the link 24 and the other end carrying a lug 27 registering with an adjustable stop 28. Mounted on the crank 25 is an idler roller 29 disposed to be engaged by a loop of the film 30 as it passes from the feed spool 11 past the film gate (not shown) to the film takeup mechanism described hereinafter. By virtue of the connecting link 24 between the crank 25 and the movable cage 21, 22, the tension of the film loop on the idler roller 29 is transmitted to the cage 21, 22 to adjust the braking force, as described hereinafter.

The slip-clutch mechanism of the invention further comprises a power input for intermittently advancing the film and for driving a takeup spool. Specifically, this may be in the form of a drive coupling 31 connected to a drive shaft 32 which, through bevelled gearing 33, drives a pinion 34 which, in turn, drives an intermittent mechanism 35 which may be a Geneva gear or equivalent, for developing one intermittent motion for each revolution. The details of the intermittent driving mechanism are conventional and are, therefore, omitted for the sake of clarity. The intermitting driving mechanism 35, in turn, through gearing 36, 37, drives a film-metering roller 38 around which passes the film 30 to a film-takeup spool 39. A pressure roller 40, engaging the metering roller 38, ensures a firm but resilient driving connection with the film 30 for advancing it to the takeup spool 39. The spool 39 is, in turn, driven through the gearing 36, 41 and a pair of slip clutches driven thereby and shown in FIG. 2 which, in turn, through gearing 42, 43, drive the film-takeup spool 39. It will be understood that the intermittent driving mechanism 35 coupled between the power input shaft 32 and the takeup spool 39, as described, together with the metering roller 38, are effective intermittently to drive the takeup spool 39 and the roller 38.

Referring to FIG. 2, there is illustrated a slip-clutch mechanism interposed between the power input and the takeup spool, such mechanism being effective automatically to increase the driving torque of the takeup spool when a predetermined amount of film is wound thereon. Referring specifically to FIG. 2, which is a longitudinal sectional view developed along the irregular line 2—2 of FIG. 1, elements corresponding to those shown in FIG. 1 are identified by the same reference numerals. The slip-clutch mechanism includes two constant-torque slip clutches interconnected so that a single clutch is effective for all film diameters on the takeup spool 39 below a predetermined value, that is for speeds of the takeup spool above a predetermined value, while both clutches are effective for film diameters on such spool above a predetermined value, that is for speeds of the spool below a predetermined value.

The first of the slip clutches includes a driven element 44 and a driving element 45, the element 44 having an internal bore, the element 45 having an external hub, and the two elements being interconnected by a helical friction spring 46. As used herein and in the appended claims, the term "driven elements" of a slip clutch denotes the input element adapted to be driven by a source of power, while the term "driving element" denotes the slip element adapted to be connected to the load device. The driven element 44 includes, as a unitary part thereof, the driving gear 41 driven by the gearing 36 as above described. The driven element 44 is loosely journalled on a shaft 47 journalled in the sides of the frame 10 while the driving element 45 is secured to shaft 47.

The second slip clutch is of similar construction and comprises a driving element 48 having unitary gearing 49 engaging a gear 50 integral with the driving element 45. The second clutch also includes a driven element 51 interconnected with the driving element 48 through a helical friction spring 52. The slip-clutch assembly includes a driving connection between the driven element 44 of the first clutch and the driven element 51 of the second clutch, this driving connection being in the form of the bidirectional gearing 41, 53. Similarly, there is a driving connection between the driving element 45 of the first clutch and the driving element 48 of the second clutch, this driving connection being in the form of bidirectional gearing 50, 49 unitary with the elements 45, 48, respectively.

The slip-clutch assembly as described thus comprises two slip clutches, the driven element 44 of the first clutch constituting a power input to the assembly and the driving element 48 of the other clutch constituting a power output. The element 48 is therefore secured to a shaft 54 journalled in the sides of the frame 10 and constituting also the drive shaft for the film-takeup spool 39. As illustrated in FIG. 2, the driving ratio from the gear 41 to the gear 53 is greater than unity while the driving ratio from the gear 50 of the first clutch to the gear 49 of the second clutch is less than unity; that is, the driving ratios or gear ratios of the driving connections between the driven elements and between the driving elements from the second clutch to the first clutch, looking in the same direction, are unequal.

Considering first the operation of the controllable brake mechanism, the springs 18 are pre-stressed to engage the drum 14 tightly and to rotate the cage 21, 22 clockwise, as seen in FIG. 1, to the position illustrated in which the trailing edge of the notch 23 engages the post 19. Under these conditions, the springs 18 exert the maximum frictional engagement with the drum 14 and effect a maximum braking force on the feed spool 11. Upon an increase in the tension of the film under the pull of the metering roller 38, the film loop about the roller 29 is effective to rotate the crank 25 in a counterclockwise direction about its pivot 26 and, in turn, rotates the cage 21, 22 counterclockwise about the shaft 15, loosening the frictional engagement between the springs 18 and the drum 14 and releasing film from the feed spool 11 in response to film tension. That is, the controllable brake automatically regulates the rotation of the feed spool 11 to maintain the tension on the film 30 within narrow predetermined limits as it is drawn through by the film transport. At the same time, when the tension on the film 30 decreases during the deceleration of the intermittent cycle, a maximum braking force is developed substantially instantaneously to prevent overshooting of the feed spool 11 and the formation of a slack loop of film between the spool 11 and the film gate.

Figure 4:
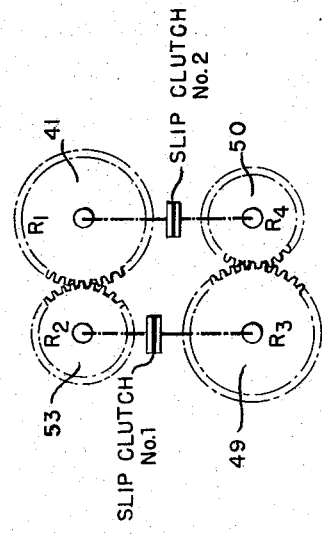
FIG. 4 is a schematic diagram to aid in explanation of the invention.

The operation of the cascade slip-clutch assembly will be described by reference to the explanatory diagram of FIG. 4. The explanation will be simplified by the assumption of certain system parameters as follows, although it will be understood that the invention is applicable to apparatus of widely different system parameters.

Radius spool 39:
    Empty _____ 1 inch.
    Full _____ 3 inches.
Torque of clutch No. 1 in the driving direction _____ 7 lb. inches.
Torque of clutch No. 1 in the reverse direction (over-running) _____ 0 lb. inch.
Torque of clutch No. 2 _____ 7 lb. inches.
Speed ratio $R_1/R_2 = R_3/R_4 \approx (\sqrt{2})$, so that
$$R_1/R_2 \times R_3/R_4 \approx 2$$
Speed of input gear 41 _____ 1 unit.
Speed of empty takeup spool _____ 0.9 $R_1/R_2$.

Consider first the condition in which the takeup spool 39 is empty. On the foregoing assumption, the speed of the gear 53 is then $R_1/R_2$, the speed of the gear 49 is 0.9 $R_1/R_2$, while the speed of the gear 50 is 0.9

$$R_1/R_2 \times R_3/R_4$$

or 1.8. That is, the speed of the gear 50 is higher than that of the gear 41 and slip clutch No. 2 is overrunning. Under these conditions, no torque is applied to the takeup spool 39 through clutch No. 2, the entire torque being applied through clutch No. 1 which, on the assumption, is 7 lb. inches. Since the winding radius of the film under these conditions is 1 inch, the tension on the film will be 7 pounds.

Consider next the transition point which is, under the assumed conditions, that at which the winding radius of the film on the spool 39 is 1.8 inches. Since, as stated above, the film is transported past the metering roller 38 at constant velocity, the speed of the gear 49 will be 0.5 $R_1/R_2$ and the speed of the gear 50 will be 0.5

$$R_1/R_2 \times R_3/R_4$$

which is equal to 1, that is, the gears 50 and 41 are rotating at the same speed. Under these conditions, clutch No. 1 is supplying a torque to the takeup spool 39 such that it develops a tension on the film of 7/1.8 or 3.9 pounds. At the same time, clutch No. 2 is applying a torque to the spool 39 effective to develop a tension on the film of $7 \times R_3/R_4$ or $7 \times 1.4/1.8$ which is equal to 5.5 pounds so that the total tension on the film at this point is 9.4 pounds.

Finally, consider the condition in which the takeup spool 39 is full of film so that the winding radius is 3 inches. Under these conditions, the speed of the gear 49 is 0.3 $R_1/R_2$ and the speed of the gear 50 is 0.6. Therefore, clutch No. 2 is slipping so that the gear 41 overruns the gear 50 in the ratio 1:0.6. Under these conditions, clutch No. 1 applies a torque on the spool 39 effective to develop a tension on the film of 7/3 or 2.3 pounds while clutch No. 2 applies a torque to the takeup spool 39 effective to develop a tension on the film of 3.3 pounds so that the total tension on the film is now 5.6 pounds.

Thus it is seen that, in winding film on the takeup spool from a winding radius of 1 inch to a winding radius of 3 inches, the maximum film tension is 9.4 pounds while, of course, if a single constant-torque slip clutch were utilized, the film tension when the spool is empty would be three times that when full, namely 16.8 pounds. The obvious advantages of the slip-clutch arrangement described above are that the maximum tension on the film may be kept at a lower value and within the safe limits of the film and that the power requirements of the power drive are also kept at a lower level.

While there has been described what is, at present, considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. In a film-transport apparatus, a slip-clutch mechanism comprising:
   (a) two independent constant-torque slip clutches, each having a driving element and a driven element and at least one of said clutches being of the overrunning type;
   (b) the driven element of one of said clutches constituting a sole power input and the driving element of the other of said clutches constituting a sole power output;
   (c) a bidirectional driving connection between said driving elements;
   (d) and a bidirectional driving connection between said driven elements;
   (e) the drive ratios of said connections being unequal, whereby for speeds of said power output above a predetermined value only one of said slip clutches is effective and for speeds of said power output below said predetermined value both of said clutches are effective.

2. In a film-transport apparatus, a slip-clutch mechanism comprising:
   (a) two independent constant-torque slip clutches, each having a driving element and a driven element and at least one of said clutches being of the overrunning type;
   (b) the driven element of one of said clutches constituting a sole power input and the driving element of the other of said clutches constituting a sole power output;
   (c) a bidirectional gear connection between said driving elements;
   (d) and a bidirectional gear connection between said driven elements;
   (e) the gear ratios of said connections being unequal, whereby for speeds of said power output above a predetermined value only one of said slip clutches is effective and for speeds of said power output below said predetermined value both of said clutches are effective.

References Cited by the Examiner

UNITED STATES PATENTS

| | | | |
|---|---|---|---|
| 1,976,197 | 10/1934 | Spence | 242—55.14 |
| 2,827,245 | 3/1958 | Kleinschmidt et al. | 242—55 |
| 2,869,684 | 1/1959 | Tarbuck | 242—75.43 X |
| 2,905,406 | 9/1959 | Falck-Pedersen | 242—75.43 |
| 3,045,941 | 7/1962 | Keesling | 242—71.8 |

FOREIGN PATENTS 313,672  6/1929  Great Britain.

MERVIN STEIN, *Primary Examiner.*

HARRISON R. MOSELEY, *Examiner.*